United States Patent Office 2,843,489
Patented July 15, 1958

2,843,489
MIXED PACKET PHOTOGRAPHIC EMULSIONS WITH POLYVINYL RESIN CONTINUOUS PHASE

Ransford B. Wilson and William F. Knechel, Rochester, N. Y., assignors to Eastman Kodak Company, Rochester, N. Y., a corporation of New Jersey No Drawing. Application July 29, 1955
Serial No. 525,345
7 Claims. (Cl. 96—98)

This invention relates to color photography and particularly to packet photographic emulsions.

As referred to herein a "packet" emulsion is one in which discrete particles or packets of a protein material such as gelatin or gelatin derivative (as hereinafter described) contain silver halide emulsion and a dyeing material such as a water-soluble dye or color coupler, or oil soluble dyes or couplers or vat dyes and are dispersed in a continuous phase or matrix of a high polymer in a suitable solvent, usually a water-soluble, water-permeable polyvinyl resin or a derative of such resin. Two or more packet emulsions may be mixed or coated in a single matrix or continuous phase to form a mixed packet emulsion.

Packet emulsions have been made in various ways such as by the use of synthetic resins to form and stabilize the packets which are incorporated in a gelatin matrix. A process of this type is described in Godowsky U. S. Patent 2,698,794. Packet emulsions have also been made using natural materials such as algin (Godowsky U. S. Patent 2,548,526) and zein (Lowe U. S. Patent 2,563,791) to form and stabilize the packets or by using hardened particles of gelatin containing silver halide and color-forming compound (Baines, Teal and Davey U. S. Patent 2,618,- 553). In each case, the continuous phase or matrix is gelatin or similar protein material.

Polyvinyl resins have been used as the continuous phase for emulsions containing dispersed particles of gelatin having dye or color-forming compounds associated therewith (British Patent 540,368). These are not "packets" as defined herein since the particles of gelatin and dye or color former do not contain the silver halide.

We have now found a method by which packet emulsions may be readily and simply made and which method does not involve the necessity for separating the packets from the original dispersion as by decantation or by centrifuging and redispersing them and which also avoids the necessity for using additional polymer to cause the gelatin packet phase to separate or to stabilize the gelatin phase or to stabilize the dispersion.

This simplification is achieved by the use of a matrix (continuous phase) polymer and gelatin or gelatin derivative, which are incompatible with each other under the conditions of forming and stabilizing the packets, i. e., at a suitable pH and in the presence of a suitable solvent and relatively small amounts of other added substances.

Our method in its broader aspects involves adding an emulsion of silver halide in a protein material such as a gelatin derivative, above its isoelectric point, to a solution of a water-soluble, or partially water-insoluble, water-permeable polyvinyl resin, adjusting the pH of the mixture approximately to the isoelectric point of the protein material, thereby forming packets or particles of the protein material in the resin and mixing a water-soluble dyeing material, such as a dye or color former, with the emulsion at a suitable stage to form packets containing protein material, silver halide and dyeing material.

Usually the addition of the dye or color former to the external phase, as just described, is feasible only with acid dyes and color formers having acid groups such as carboxylic acid or sulfonic acid. These compounds can be made soluble in water and combine readily with the gelatin or other protein material, whereas the polyvinyl resin has no groups with which the dye can combine. If water-insoluble dyes or color formers are used, these must usually be dispersed in the gelatin of the photographic emulsion, or in a portion of gelatin which is later mixed with the emulsion, before the formation of packets.

The protein material used according to our invention is gelatin, or a gelatin derivative such as those which are obtained by treatment of gelatin with:

Aromatic sulfonyl chlorides and carboxylic acid chlorides, e. g.,
    m-Carboxybenzene sulfonyl chloride
    4-chlorosulfonyl phthalic acid
    p-Chlorosulfonyl phenoxyacetic acid
    3,5-dicarbomethoxy phenoxy acetyl chloride
    δ - (3,5 - dicarbomethoxy phenoxycarbamyl) - valeryl chloride
    3-nitrobenzoyl chloride Carbocyclic or carboxylic acid derivatives of gelatin, e. g., those which are obtained by treating gelatin with:
    Phthalic anhydride
    Benzoic anhydride
    Succinic anhydride
    Adipic anhydride
    Maleic anhydride
Cyanoethylated gelatin
Phenylureido gelatin Many of these gelatin derivatives can be hardened with polyvalent metal salts such as aluminum, chromium, zirconium, thorium, etc. These hardeners are of advantage in avoiding the use of aldehyde hardeners, which have undesirable effects on color couplers.

The aromatic sulfonyl and carboxylic acid chloride derivatives and the carboxylic acid derivatives of gelatin are described in Yutzy and Frame U. S. Patent 2,614,928. Cyanoethylated gelatin is described in Gates and Lowe British Patent 648,926.

The polyvinyl resin used as the matrix polymer or continuous phase may be any of various hydrolysis grades of polyvinyl alcohol, polyvinyl acetals and carboxylated polyvinyl acetals. Solvents for the matrix polymers include water, water-miscible organic solvents, mixtures of water and organic solvents and organic solvents that are immiscible or only slightly miscible with water. Suitable solvents are water, liquid aliphatic alcohols, aliphatic alcohols, ketones, polyalcohols, e. g., 2,5-hexanedione, ketone alcohols, alcohol-ethers and their esters, and acetals, and other organic liquids. It is a necessary requirement that the matrix polymer be permeable to the aqueous solutions used in photographic processing.

The dyes which we use include the magenta dye made by tetrazotizing one mole of 2,2',5,5'-tetramethyl-4,4'-diamino triphenylmethane and coupling with two moles of n-heptoyl H acid:

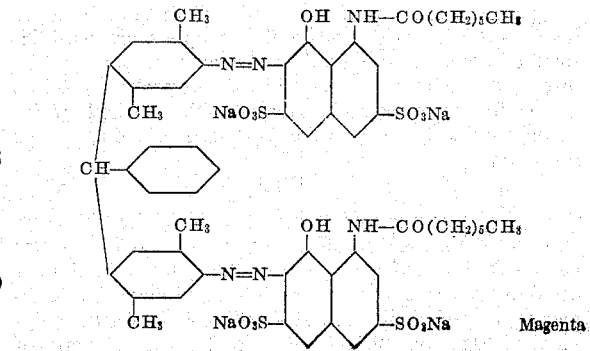

Magenta

Other water-soluble dyes are:

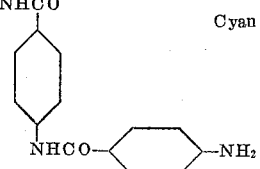

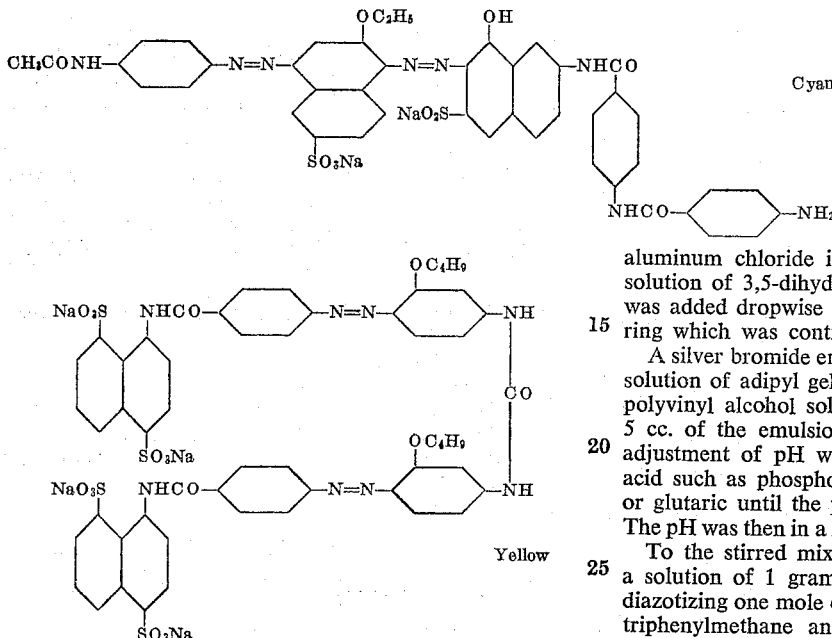

Oil-soluble color-forming compounds which react on coupling with the oxidation product of primary aromatic amino developing agents are:

1 - (2',4',6'-trichlorophenyl)-3-[3"-(2''',4'''-di-tert.-amylphenoxyacetamido)-benzamido]-5-pyrazolone (U. S. Patent 2,600,788)

2 - (2',4'-di-tert.-amylphenoxyacetamido)-4,6-dichloro-5-methylphenol (Graham S. N. 285,544)

N-(4 - benzoylacetamidobenzenesulfonyl)-N-γ-phenylpropyl)-p-toluidine (U. S. Patent 2,298,443)

α - {3 - [α - (2',4'-di-tert.-amylphenoxy)acetamido]-benzoyl}-2-methoxy-acetanilide (McCrossen et al. S. N. 476,159, now abandoned)

1-hydroxy - 4 - phenylazo - 4' - (p-tert.-butylphenoxy)-2-naphthanilide (U. S. Patent 2,521,908)

Water-soluble color-forming compounds which react on coupling with the oxidation product of primary aromatic amino developing agents are:

1-[4' - (2" - sulfobenzamido)phenyl] - 3 - stearamido-5-pyrazolone 2,4-dichloro-3-methyl-6-[2'-(2''',4'''-di-tert. amylphenoxy) 5'-(3'',5''-dichlorosulfonyl)-benzamido]benzamido-phenol The packet emulsions or mixed packet emulsions of our invention are suitable for use in the dye bleach process of color photography in which the dyes incorporated in the packets are bleached, after development and fixing, with a solution which destroys the dye in the presence of metallic silver. When couplers are incorporated in the packets, the emulsions of our invention can be used for the color-forming process of color photography in which the emulsion is developed directly or after removal of the first developed silver, in a solution of a primary aromatic amino developing agent such as 2,5-diethylaminotoluene hydrochloride. When oil-soluble couplers are used instead of water-soluble couplers, the couplers must first be dispersed in gelatin and then added to the packet emulsion.

The following example illustrates the method of incorporating a dye in a packet emulsion according to our invention:

EXAMPLE 1

5 cc. of a solution of 35 grams of high viscosity polyvinyl alcohol in 65 cc. of water was heated in a water bath with 1 cc. of a solution of 2.5 grams of 3,5-dihydroxytoluene in 25 cc. of absolute ethyl alcohol (the dihydroxytoluene being used as a gelling agent for the polyvinyl alcohol) and 0.1 cc. of a solution of 0.4 gram of aluminum chloride in 20 cc. of absolute alcohol. The solution of 3,5-dihydroxytoluene and aluminum chloride was added dropwise with constant speed mechanical stirring which was continued through the following step:

A silver bromide emulsion made by using a 5% aqueous solution of adipyl gelatin as the vehicle was added to the polyvinyl alcohol solution with continuous stirring until 5 cc. of the emulsion had been added. A preliminary adjustment of pH was then made by adding a mineral acid such as phosphoric or an organic acid, e. g., acetic or glutaric until the packets were formed and stabilized. The pH was then in a range of 3.5–4.5.

To the stirred mixture there was then added 1 cc. of a solution of 1 gram of the magenta azo dye made by diazotizing one mole of 2,2',5,5'-tetramethyl-4,4'-diaminotriphenylmethane and coupling with two moles of H acid, in 49 cc. of distilled water. Upon continued stirring the dye was taken up directly by the packets and retained in them. The mixture was allowed to cool to about room temperature. A second packet dispersion was made in the same way using the cyan dye listed above instead of the magenta dye. The mixtures of differently formed packets containing different dyes were then mixed for coating. The coating was gelled by lowering the temperature and dried at room temperature.

After exposure, this layer was treated with a polyvinyl alcohol hardening solution of 30 cc. of formalin and 5 g. of ammonium chloride in a liter of water, washed, dried, and developed in the following developer for a series of times ranging from ¼ minute to 2 minutes:

| | Grams |
|---|---|
| N-methyl-p-aminophenol sulfate | 2.5 |
| Hydroquinone | 2.5 |
| Sodium sulfite (desiccated) | 50 |
| Sodium metaborate | 20 |
| Potassium bromide | 0.5 |
| Water to 1 liter. | |

After a ½ minute stop in 125 cc. of acetic acid in one liter of water, the film was fixed for 3 minutes in a solution of 150 g. of ammonium thiosulfate in 800 cc. of water, washed and the dye bleached in the sodium stannite bleach of Example 2.

After a further water wash, the silver was bleached in a solution of 100 g. of $CuCl_2 \cdot 2H_2O$ and 25 cc. of concentrated hydrochloric acid in one liter of water, fixed in a fresh solution of the ammonium thiosulfate fixing bath stated above, washed and dried.

If the packets precipitate too readily, a mixture of ordinary gelatin and gelatin derivative can be used in making the sensitive emulsion, as shown in the following example:

EXAMPLE 2

An aqueous solution of 35 grams of polyvinyl alcohol (20% solids) was mixed with 32 cc. of water and 33 cc. of ethyl alcohol, and heated to 40° C. A 10% solution of orcinol (3,5-dihydroxytoluene) was added dropwise with constant medium speed stirring until 20% of the volume of the polyvinyl alcohol solution had been added. The solution was then cooled to 35° C. and a 1% solution in water of the cyan azo dye listed above was added until a volume equal to the volume of orcinol solution had been added.

A red-sensitive emulsion was made by first mixing 7.5 cc. of a red-sensitized gelatino-silver chlorobromide emulsion (80% chloride) with 30 cc. of a 6% aqueous solution of phthalic anhydride gelatin made by treating ordinary gelatin with 20% of its weight of phthalic anhydride as described in Yutzy and Frame U. S. Patent 2,525,753. This emulsion was added to the polyvinyl alcohol-azo dye solution by running it in from a pipette while stirring the solution. Packets of emulsion containing the dye are formed upon adjusting the pH with acid, such as a 5% aqueous solution of phosphoric acid. The pH should be adjusted to the isoelectric point of the gelatin mixture or slightly above.

A green-sensitive packet emulsion was made in an identical manner except that a 2% solution in water of the magenta azo dye listed above was used, and the emulsion was green-sensitized instead of red-sensitized.

The lots of red-sensitive packet emulsion and green-sensitive packet emulsion were mixed in equal proportion and were coated at room temperature. The coating was gelled by lowering its temperature and was then dried at room temperature.

After exposure, this coating was processed as follows:
The coating was developed for 2 minutes in a developer of the following composition at pH 5.32:

| | |
|---|---|
| Diaminophenol hydrochloride | grams__ 10 |
| Sodium sulfite, des. | do____ 15 |
| Sodium bisulfite | do____ 100 |
| 5-Methylbenzotriazole (0.5% solution) | cc__ 6.24 |
| Water | cc__ 965 |

After ½ minute in a stop bath of 125 cc. of 28% acetic acid in one liter of water, the coating was fixed for 10 minutes in the following fixing solution:

| | |
|---|---|
| Hypo | grams__ 240 |
| Sodium sulfite, des. | do____ 15 |
| Acetic acid (28% solution) | cc__ 48 |
| Boric acid crystals | grams__ 7.5 |
| Potassium alum | do____ 15 |
| Water to 1 liter. | |

After a two-minute wash, the coating was bleached for 1.5 minutes in the following sodium stannite bleach:

*Solution A*

| | |
|---|---|
| Sodium hydroxide | grams__ 50 |
| Water | cc__ 500 |

*Solution B*

| | |
|---|---|
| Stannous chloride (des.) | grams__ 33.6 |
| Water | cc__ 500 |

(For use, Solution A is added to Solution B in equal amount)

After a five-minute water wash, the silver was removed by bleaching for two minutes in the following solution:

| | |
|---|---|
| Cupric chloride | grams__ 100 |
| Hydrochloric acid, conc. | cc__ 25 |
| Potassium alum | grams__ 75 |
| Water to 1 liter. | | and fixing for 5 minutes in the same fixing solution as before. After a further 5-minute wash, the coating was dried at 125° F.

A number of advantages are derived from this direct method of packet formation. There is no intermediate matrix and no need for intermediate centrifuging, sedimentation and other removal steps for the formation medium for transfer to a final matrix carrier. There is no dilution of the silver halide emulsion or the dye or color former by auxiliary packet forming or stabilizing polymers which increase the coating thickness required to give sufficient dye density. No special equipment is needed and no new silver halide emulsions or emulsion techniques are required. Frequently, the synthetic polymers used in the matrix such as polyvinyl alcohol possess physical characteristics superior to those of gelatin, especially when used under tropical conditions.

It will be understood that the invention described herein is not limited to the examples and modifications referred to above but is to be taken as limited only by the scope of the appended claims.

We claim:

1. The method of making a packet photographic emulsion which comprises adding an emulsion of silver halide in protein material to a solution of a water-permeable polyvinyl resin, adjusting the pH of the mixture approximately to the isoelectric point of the protein material, thereby forming packets or particles of the protein material in the resin, cooling and gelling the packet emulsion, and mixing with the emulsion at some stage in the process a dyeing material selected from the class consisting of bleachable dyes and color-forming compounds capable of coupling with the oxidation product of primary aromatic amino developers.

2. The method of making a packet photographic emulsion which comprises adding a silver halide emulsion in a 5% solution of adipyl gelatin as the vehicle to a solution of hardened polyvinyl alcohol containing a gelling agent, adjusting the pH of the mixture to 3.5 to 4.5, thereby forming packets or particles of gelatin emulsion in the polyvinyl alcohol, and then mixing a solution of an amino-naphthol azo dye with the packet emulsion to form dispersed packets of gelatin emulsion containing said dye.

3. The method of making a mixed packet photographic emulsion which comprises adding a silver halide emulsion sensitive to one region but less than all regions of the visible spectrum, said emulsion having a 5% solution of adipyl gelatin as the vehicle, to a solution of hardened polyvinyl alcohol containing a gelling agent, adjusting the pH of the mixture to 3.5 to 4.5, thereby forming packets or particles of adipyl gelatin emulsion in the polyvinyl alcohol, and then mixing a solution of an aminonaphthol azo dye with the packet emulsion to form dispersed packets of adipyl gelatin emulsion containing said dye, similarly forming at least one other emulsion of particles of adipyl gelatin containing silver halide sensitive to a region of the visible spectrum different from that to which said first-mentioned silver halide is sensitive, and containing a different aminonaphthol azo dye, and mixing said last-mentioned emulsion with said first-mentioned emulsion.

4. The method of making a packet photographic emulsion which comprises mixing a silver halide emulsion in ordinary photographic gelatin with about four times its volume of a 6% solution of phthalic anhydride gelatin, adding the mixture to a solution of hardened polyvinyl alcohol containing a gelling agent, adjusting the pH of the mixture to a point slightly above the isoelectric point of the gelatin mixture, thereby forming packets or particles of gelatin emulsion in the polyvinyl alcohol, and then mixing a solution of an aminonaphthol azo dye with the packet emulsion to form dispersed packets of gelatin emulsion containing said dye.

5. The method of making a mixed packet photographic emulsion which comprises mixing a silver halide emulsion in ordinary photographic gelatin and sensitive to one region but less than all regions of the visible spectrum, with about four times its volume of a 6% solution of phthalic anhydride gelatin, adding the mixture to a solution of hardened polyvinyl alcohol containing a gelling agent, adjusting the pH of the mixture to a point slightly above the isoelectric point of the gelatin mixture, thereby forming packets or particles of gelatin emulsion in the polyvinyl alcohol, and then mixing a solution of an aminonaphthol azo dye with the packet emulsion to form dispersed packets of gelatin emulsion containing said dye, similarly forming at least one other emulsion of gelatin particles containing silver halide sensitive to a region of the visible spectrum different from that to which said first-mentioned silver halide is sensitive, and containing a different aminonaphthol azo dye, and mixing said last-mentioned emulsion with said first-mentioned emulsion.

6. The method of making a packet photographic emulsion which comprises adding a silver halide emulsion in a 5% solution of adipyl gelatin as the vehicle to a solution of hardened polyvinyl alcohol containing a gelling agent, adjusting the pH of the mixture to 3.5 to 4.5, thereby forming packets or particles of gelatin emulsion in the polyvinyl alcohol, and then mixing a dispersion of a color-forming compound capable of coupling with the oxidation product of a primary aromatic amino developing agent with the packet emulsion to form dispersed packets of gelatin emulsion containing said color-forming compound.

7. The method of making a packet photographic emulsion which comprises adding a silver halide emulsion in a 5% solution of adipyl gelatin as a vehicle to a solution of hardened polyvinyl alcohol containing a gelling agent and an amino-naphthol azo dye, adjusting the pH of the mixture to 3.5 to 4.5, thereby forming packets or particles of gelatin emulsion in the polyvinyl alcohol, said packets containing said dye.

References Cited in the file of this patent

UNITED STATES PATENTS

| | | |
|---|---|---|
| 2,284,877 | Martinez | June 2, 1942 |
| 2,698,794 | Godowsky | Jan. 4, 1955 |

FOREIGN PATENTS

| | | |
|---|---|---|
| 540,368 | Great Britain | Oct. 15, 1941 |